(12) United States Patent
Hu et al.

(10) Patent No.: US 10,708,475 B2
(45) Date of Patent: Jul. 7, 2020

(54) OPTICAL MEMBER DRIVING MODULE

(71) Applicant: TDK TAIWAN CORP., Taoyuan (TW)

(72) Inventors: Chao-Chang Hu, Taoyuan (TW); Chen-Hsien Fan, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 16/259,227

(22) Filed: Jan. 28, 2019

(65) Prior Publication Data

US 2019/0158711 A1 May 23, 2019

Related U.S. Application Data

(63) Continuation of application No. 15/479,708, filed on Apr. 5, 2017, now Pat. No. 10,230,878.

(60) Provisional application No. 62/320,096, filed on Apr. 8, 2016.

(30) Foreign Application Priority Data

Mar. 17, 2017 (TW) .............................. 106108888 A

(51) Int. Cl.
*H04N 5/225* (2006.01)
*H04N 5/232* (2006.01)
*H01L 27/146* (2006.01)

(52) U.S. Cl.
CPC ................................ *H04N 5/2253* (2013.01)

(58) Field of Classification Search
CPC .............. H04N 5/2253; H04N 5/2254; H04N 5/23287; H01L 27/14618
USPC ....... 348/308, 335, 360, 373–376, 126, 133, 348/208.11; 257/291, 292, 28, 27, 324, 257/464, 508, 635; 396/91, 133, 219, 396/529, 444, 535; 250/208.1; 359/425, 359/822–826

See application file for complete search history.

(56) References Cited

U.S. PATENT DOCUMENTS

| 8,295,685 B2 | 10/2012 | Yoshida et al. |
| 9,742,972 B2* | 8/2017 | Lai ........................ H04N 5/2257 348/373 |
| 10,281,736 B2* | 5/2019 | Gomyo .................. G02B 27/64 359/557 |
| 2009/0128684 A1 | 5/2009 | Apel |

(Continued)

FOREIGN PATENT DOCUMENTS

| CN | 103064230 A | 4/2013 |
| TW | I436118 B | 5/2014 |
| TW | 201518800 A | 5/2015 |

OTHER PUBLICATIONS

U.S. Appl. No. 15/479,662, filed Apr. 5, 2017.
U.S. Appl. No. 15/481,897, filed Apr. 7, 2017.
U.S. Appl. No. 15/482,112, filed Apr. 7, 2017.

*Primary Examiner* — Marly S Camargo
(74) *Attorney, Agent, or Firm* — Muncy, Geissler, Olds & Lowe, P.C.

(57) ABSTRACT

A camera module is provided, including a bottom, an electromagnetic driving assembly, and a lens assembly. The bottom includes a metal member, a first insulation layer formed on the metal member, and a first conductive layer formed on the first insulation layer. The first conductive layer is electrically connected to the electromagnetic driving assembly. The electromagnetic driving assembly can drive the lens assembly to move relative to the bottom.

8 Claims, 4 Drawing Sheets

(56) References Cited

U.S. PATENT DOCUMENTS

| | | | |
|---|---|---|---|
| 2011/0026148 A1* | 2/2011 | Tanimura | F03G 7/065 |
| | | | 359/823 |
| 2011/0199530 A1 | 8/2011 | Kosaka et al. | |
| 2012/0105696 A1 | 5/2012 | Maeda | |
| 2013/0016427 A1* | 1/2013 | Sugawara | G02B 27/64 |
| | | | 359/557 |
| 2013/0100521 A1* | 4/2013 | Long | G02F 1/29 |
| | | | 359/319 |
| 2014/0339668 A1 | 11/2014 | Arima et al. | |
| 2015/0103195 A1* | 4/2015 | Kwon | H04N 5/2328 |
| | | | 348/340 |
| 2015/0146073 A1 | 5/2015 | Kim | |
| 2017/0294476 A1* | 10/2017 | Hu | H01L 27/14683 |
| | | | 348/374 |
| 2017/0295304 A1 | 10/2017 | Hu et al. | |
| 2019/0121055 A1* | 4/2019 | Lee | G02B 7/02 |
| | | | 359/694 |
| 2019/0189667 A1* | 6/2019 | Jung | H01L 27/14636 |
| | | | 257/432 |

* cited by examiner

OPTICAL MEMBER DRIVING MODULE

CROSS REFERENCE TO RELATED APPLICATIONS

This application is a Continuation of application Ser. No. 15/479,708, filed on Apr. 5, 2017, which claims the benefit of U.S. Provisional Application No. 62/320,096, filed on Apr. 8, 2016, and Taiwan Patent Application No. 106108888, filed on Mar. 17, 2017, the entirety of which is incorporated by reference herein.

BACKGROUND OF THE INVENTION

Field of the Invention

The application relates in general to a camera module, and in particular, to a camera module having a bottom, wherein the bottom includes a metal member.

Description of the Related Art

Some electronic devices are equipped with a driving module to drive an element to move a predetermined distance. For example, a lens driving device in a camera usually includes a driving module to generate motive power. One or more optical lens units of the lens driving device are driven by the motive power to move along a direction perpendicular to an optical axis, so as to facilitate image stabilization.

The conventional driving module usually comprises a flexible printed circuit board for electrically connecting an external circuit to the inner electronic members. However, the flexible printed circuit board should be disposed on a bottom made of plastic for retaining the flatness of the flexible printed circuit board. Due to the restrictions of using plastic in manufacturing, the bottom must have a certain thickness, and it is hard to reduce the volume of the driving module. Furthermore, when the electronic device is assembled or moved, the flexible printed circuit board may be curved, and the flatness of the driving module may be reduced.

On the other hand, the alignment error between the flexible circuit board and the bottom may be occurred when joining, and the yield may be reduced. Furthermore, since the process of joining usually takes a lot of time, it is hard to improve capacity.

BRIEF SUMMARY OF INVENTION

In order to address the drawbacks of the prior art, one objective of the disclosure is to provide a micro lens driving module that drives a lens assembly to move along a direction perpendicular or parallel to an optical axis.

In accordance with some embodiments of the disclosure, the camera module includes a bottom, an electromagnetic driving assembly, and a lens assembly. The bottom includes a metal member, a first insulation layer formed on the metal member, and a first conductive layer formed on the first insulation layer. The first conductive layer is electrically connected to the electromagnetic driving assembly. The electromagnetic driving assembly can drive the lens assembly to move relative to the bottom.

In the above-mentioned embodiments, the thickness of the metal member exceeds the total thickness of the first insulation layer and the first conductive layer.

In the above-mentioned embodiments, the thickness of the metal member is 0.10 mm-0.35 mm.

In the above-mentioned embodiments, the bottom further comprises a second insulation layer and a second conductive layer. The second insulation layer is formed on the metal member. The first insulation layer and the second insulation layer are formed on opposite surfaces of the metal member. The second conductive layer is formed on the second insulation layer.

In the above-mentioned embodiments, the camera module further comprises an image sensor, and the second conductive layer is electrically connected to the image sensor.

In the above-mentioned embodiments, the conductive layer is patterned on the insulation layer by using a molded interconnect device. Further, the insulation layer comprises thermoplastic, which can be activated by laser.

In the above-mentioned embodiments, the first conductive layer is formed on the first insulation layer by coating.

In the above-mentioned embodiments, the bottom further comprises an outer insulation layer and a protecting layer. The outer insulation layer is disposed on the first conductive layer, and the protecting layer is disposed on the outer insulation layer. The first insulation layer and the outer insulation layer are non-conductive glue.

In the above-mentioned embodiments, the camera module further comprises a housing surrounding the electromagnetic driving assembly and comprising a metal, wherein the housing and the bottom are connected to each other by welding.

In the above-mentioned embodiments, the metal member and the first conductive layer have the same coefficient of thermal expansion.

In the above-mentioned embodiments, the electromagnetic driving assembly further comprises a lens holder, an upper elastic sheet, and a lower elastic sheet. The lens holder has a passage, and the lens assembly is disposed in the passage. The upper elastic sheet and the lower elastic sheet are respectively disposed on opposite sides of the lens holder. A driving coil is electrically connected to the first conductive layer via the upper elastic sheet and the lower elastic sheet.

In the above-mentioned embodiments, the camera module further comprises a plurality of suspension wires connected the upper elastic sheet and the bottom.

In the above-mentioned embodiments, the metal member has a rectangular-shaped structure. The suspension wires are respectively extended through the four corners of the metal member. A plurality of connecting members are disposed on the lower surface of the metal member, and are used to connect the suspension wires.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
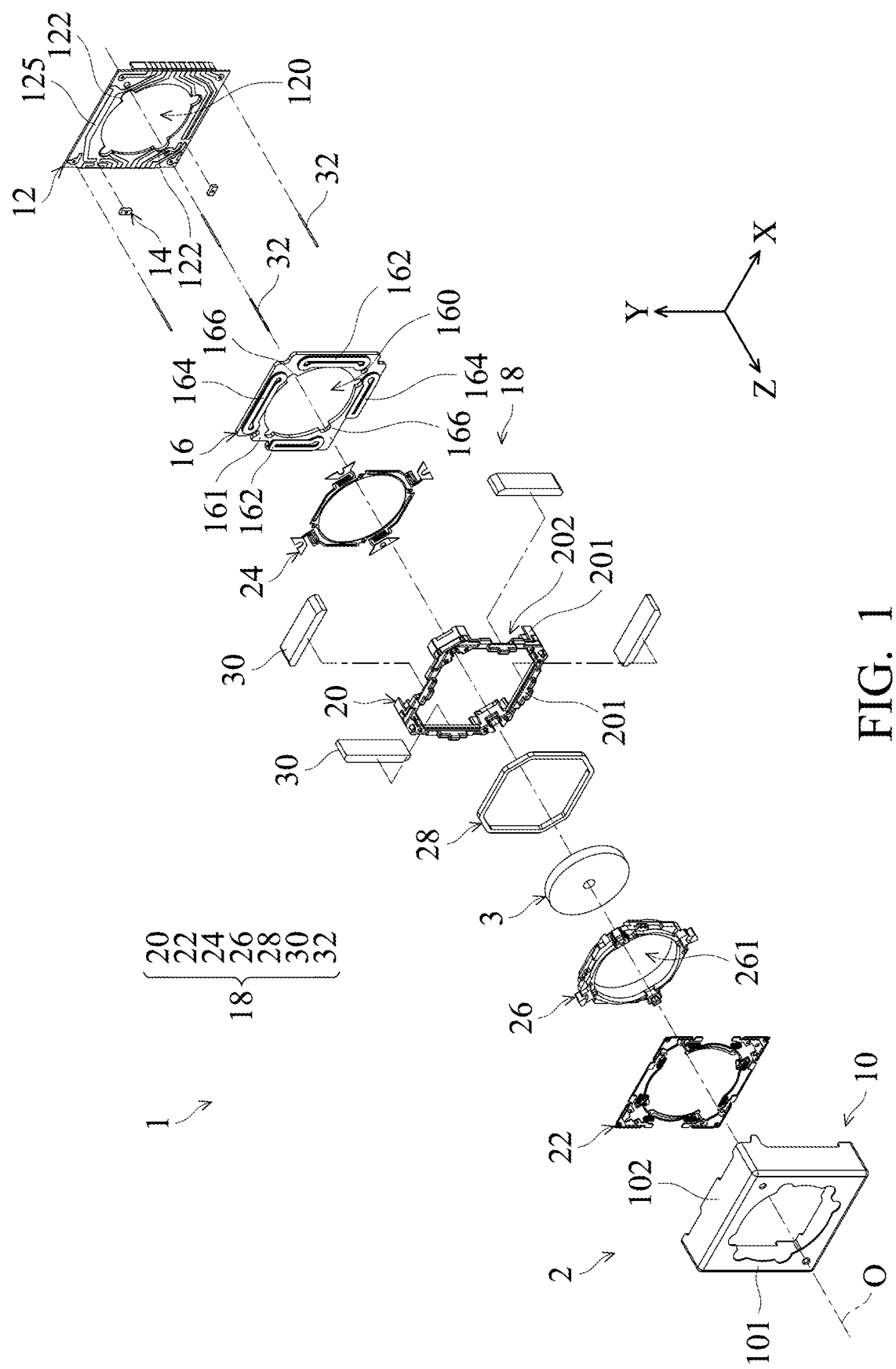
FIG. 1 is an exploded-view diagram of a lens driving module, in accordance with some embodiments of the disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "an element overlying another element", "an element is disposed above another element", "an element is disposed on another element" and "an element is disposed over another element" may indicate that the element directly contacts the other element, or it may indicate that the element does not directly contact the other element, there being one or more intermediate elements disposed between the element and the other element.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 is an exploded-view diagram of a lens driving module 1, in accordance with some embodiments of the disclosure. The lens driving module 1 comprises an electromagnetic driving assembly 2, a lens assembly 3, a housing 10, and a bottom 12. The electromagnetic driving assembly 2 is configured to support the lens assembly 3 and drive the lens assembly 3 to move relative to the bottom 12. According to some embodiments of the disclosure, the electromagnetic driving assembly 2 comprises a sensor 14, a coil board 16, and a movable portion 18. The members in the electromagnetic driving assembly 2 can be added or omitted as required, and are not limited to those in this embodiment.

The housing 10 is made of metal, and comprises an upper shell 101 and a side shell 102. The upper shell 101 has a rectangular structure, and the side shell 102 is extended from the periphery of the upper shell 102 to the bottom 12. The side shell 102 can be connected to the bottom 12 by welding. An inner space is defined by the housing 10 and the bottom 12 and used to accommodate the other members of the electromagnetic driving assembly 2. Since the housing 10 is connected to the bottom 12 by welding, the connecting strength therebetween can be enhanced.

Figure 2:
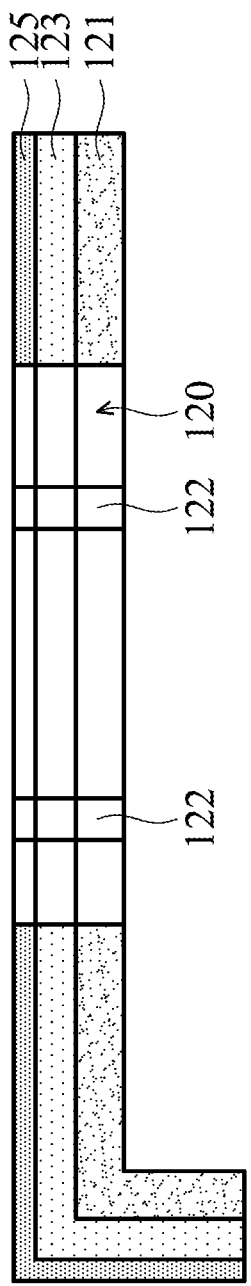
FIG. 2 is a cross-sectional view of a bottom, in accordance with some embodiments of the disclosure.

FIG. 2 is a cross-sectional view of a bottom 12. In some embodiments, the bottom 12 comprises a metal member 121, a first insulation layer 123, and a first conductive layer 125. The appearance of the metal member 121 corresponds to that of the upper shell 101. An opening 120 is formed on the center of the metal member 121. A plurality of recesses 122 are formed on the periphery of the opening 120, and each of the recesses 122 has at least one conductive contact. In some embodiments, the thickness of the metal member 121 in the direction parallel to the optical axis O is 0.10 mm-0.35 mm. The metal member 121 can comprise aluminum, copper, or an alloy thereof.

The first insulation layer 123 is formed on the metal member 121. In some embodiments, the first insulation layer 123 is connected to the metal member 121 by the nano molding technology (NMT). The first insulation layer 123 can comprise thermoplastic, which can be activated by laser. For example, the aforementioned thermoplastic can be polyethylene terephthalate (PET) or polybutylene terephthalate (PBT).

The first conductive layer 125 is formed on the first insulation layer 123. In this embodiment, the first conductive layer 125 is patterned on the first insulation layer 123 by using a molded interconnect device (MID), for example, by laser direct structuring (LDS), microscopic integrated processing technology (MIPTEC), laser induced metallization (LIM), laser restructuring print (LRP), an aerosol jet process, or a two-shot molding method. In some embodiments, the first conductive layer 125 can be formed on the first insulation layer 123 by coating. The first conductive layer 125 is exposed on the outer surface of the bottom 12 and faces the movable portion 18. In some embodiments, the portion of the first conductive layer 125 is formed on the inner wall of the recess 122, and the portion of the first conductive layer 125 is formed on four corners of the metal member 121.

Compared to the conventional bottom, which has a plastic plate and a coil or wire disposed thereon or embedded therein, the structure of the aforementioned bottom can reduce the height of the lens driving module 1.

It should be noted that the thickness of the metal member 121 in the direction parallel to the optical axis O exceeds the total thickness of the first conductive layer 125 and the first insulation layer 123 in the direction parallel to the optical axis O. Therefore, the bottom 12 has a sufficient hardness and a sufficient flatness, the inclination of the lens assembly 3 during the assembly of the lens driving module 1 can be prevented. The bottom surface of the metal member 121 is exposed without covering, so that the heat dissipation efficiency of the bottom 12 can be improved. In this embodiment, the metal member 121 and the first conductive layer 125 can have the same coefficient of thermal expansion, such that when the bottom 12 is heated, relative displacement is not generated between the metal member 121 and the first conductive layer 125.

In some embodiment, the first conductive layer 125 and the metal member 121 comprise different materials, wherein the metal member 121 has a material with high hardness and the first conductive layer 125 has a material with high electrical conductivity and thermal conductivity. Thus, the hardness of the first conductive layer 125 is less than that of the metal member 121, and the electrical conductivity and the thermal conductivity of the first conductive layer 125 exceed that of the metal member 121.

Referring to FIG. 1, the sensor 14 is configured to detect the magnetic field variation generated by the magnetic member 30. In some embodiments, the sensor 14 is disposed on the metal member 121 and electrically connected to the first conductive layer 125. The sensor 14 can be a Hall sensor.

The coil board 16 is disposed on the bottom 12, and comprises a base 161 and a plurality of driving coils (for example, two driving coils 162 and two driving coils 164). An opening 160 is formed on the center of the base 161. A plurality of recesses 166 are formed on the periphery of the opening 160, and each of recesses 166 has at least one conductive contact. The numbers and the positions of the recesses 166 correspond to those of the recesses 122. When the coil board 16 is joined with the bottom 12, a conductive material is coated on each of the recesses 166, so as to electrically connect the coil board 16 to the first conductive layer 125 of the bottom 12.

The driving coils 162 and 164 are disposed on the base 161, and connected to the first conductive layer 125 via the aforementioned conductive material. In some embodiments, two driving coils 162 are respectively adjacent to opposite sides of the bottom 12 in the direction of X-axis. Furthermore, two driving coils 164 are respectively adjacent to opposite sides of the bottom 12 in the direction of Y-axis.

The movable portion 18 is configured to support lens assembly 3, so that the lens assembly 3 can move relative to the bottom 12. In some embodiments, the movable portion 18 comprises a frame 20, an upper elastic sheet 22, a lower elastic sheet 24, a lens holder 26, a driving coil 28, a plurality of magnetic members (such as four magnetic members 30), and a plurality of suspension wires (such as four suspension wires 32).

The frame 20 comprises four side shells 201 connected to each other around the optical axis O. Each of the side shells 201 has an accommodating recess 202. The frame 20 surrounds the lens holder 26. A passage 261 is extended through the lens holder 26, and the lens assembly 3 is disposed in the passage 261. In some embodiments, the upper elastic sheet 22 and the lower elastic sheet 24 are respectively disposed on opposite sides of the frame 20 and the lens holder 26 in the direction parallel to the optical axis O. Therefore, the lens holder 26 can move relative to the frame 20 along a perpendicular direction (the direction of Z-axis).

Figure 3:
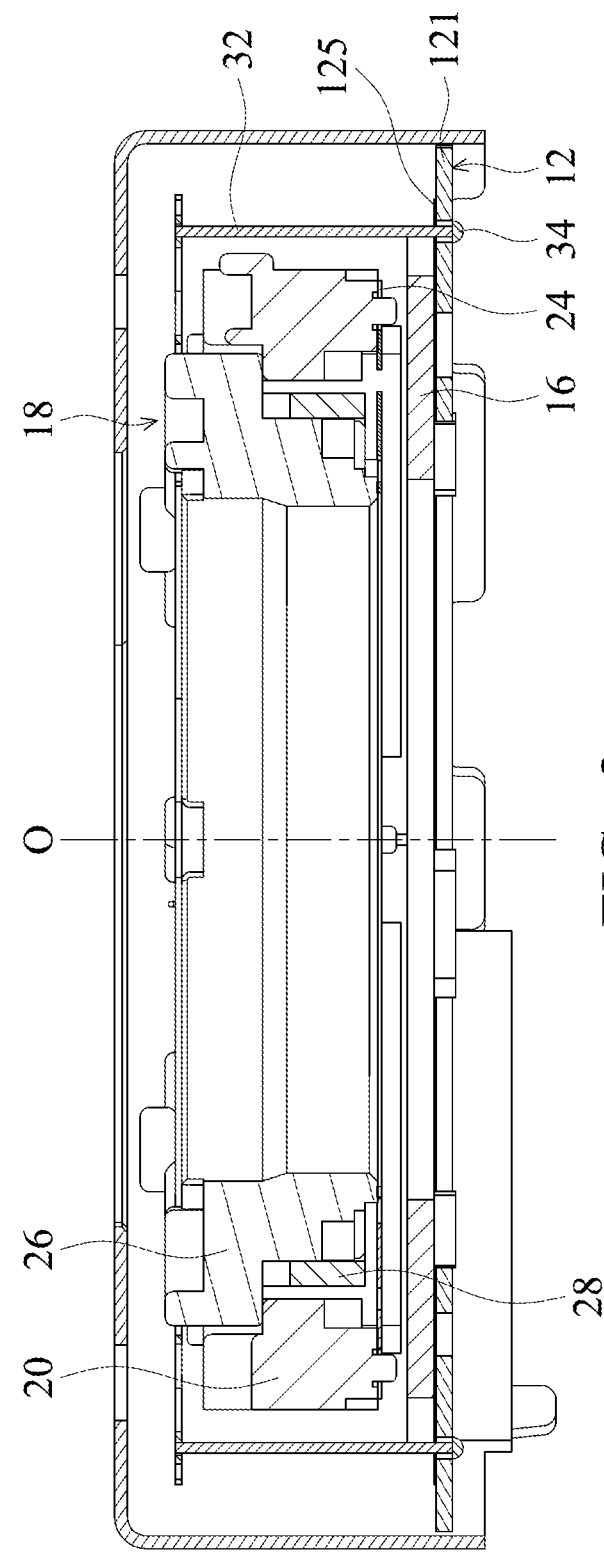
FIG. 3 is a side view of a lens driving module along a diagonal thereof, in accordance with some embodiments of the disclosure.

Referring to FIGS. 1 and 3, each of the suspension wires 32 is connected to the movable portion 18 and the bottom 12, and the movable portion 18 can move relative to the bottom 12 along the direction perpendicular to the optical axis O. In some embodiments, an end of the suspension wire 32 is connected to the upper elastic sheet 22 of the movable portion 18, and another end of the suspension wire 32 is connected to the bottom 12 and electrically connected to the first conductive layer 125 (FIGS. 1 and 2). In some embodiments, the suspension wire 32 is extended through one of the corners of the metal member 121, and the end of the suspension wire 32 is affixed to the lower surface of the bottom 12 (i.e. lower surface of the metal member 121, which is opposite to the surface forming the first insulation layer 123) by a connecting member 34.

Referring to FIG. 1, the driving coil 28 has an annular structure surrounding the outer side surface of the lens holder 26. A current can flow through the driving coil 28, and a magnetic field is formed to drive the lens holder 26 to move relative to the bottom 12. In some embodiments, the driving coil 28 is electrically connected to the upper elastic sheet 22, and an external current can transmit to the driving coil 28 through the suspension wire 32 and the upper elastic sheet 22.

For clarity, in the following description, the driving coil 28 is called "focus adjustment driving coil", and the driving coils 162 and 164 are called "OIS (optical image stabilization) driving coil".

Four magnetic members 30 are magnets, and respectively disposed on four accommodating recesses 202 of the side shells 201. Four magnetic members 30 are positioned by the frame 20, so that the magnetic members 30 can correspond to the driving coil 28 and the OIS driving coils 162 and 164. A pole of the magnetic member 30 (such as N pole) faces the lens holder 26, and another pole of the magnetic member 30 (such as S pole) faces the side shell 102.

When the electromagnetic driving assembly 2 is actuated, a control module (not shown) can provide a current to the OIS driving coils 162 and 164. Therefore, the movable portion 18 can move relative to the bottom 12 along the direction perpendicular to the optical axis O by the magnetic effect between the OIS driving coils 162 and 164 and magnetic members 30. On the other hand, when the user wants to adjust the focus position of the lens assembly 3, the control module (not shown) can provide a driving current to the focus adjustment driving coil 28. Therefore, the lens holder 26 can move relative to the bottom 12 along the direction parallel to the optical axis O by the magnetic effect between the focus adjustment driving coil 28 and magnetic members 30.

During the actuation of the electromagnetic driving assembly 2, the sensor 14 detects the magnetic field variation generated by the magnetic members 30, and transmits the information of the position of the movable portion 18 and/or the lens holder 26 relative to the bottom 12 to the control module (not shown). The control module can calculate according to the aforementioned information, and a closed-loop control can be formed.

It should be noted that the structure of the bottom 12 is not limited to the aforementioned embodiments. The following exemplary embodiments provide various bottoms of the disclosure.

Figure 4:
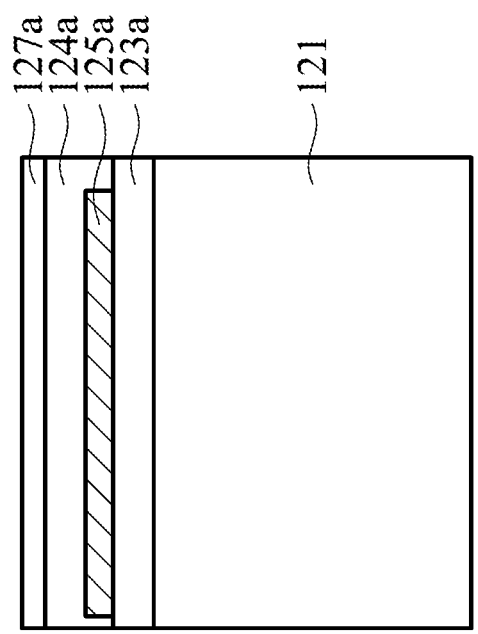
FIG. 4 is a cross-sectional view of a bottom, in accordance with some embodiments of the disclosure.

FIG. 4 is a cross-sectional view of a bottom 12a. The same features in the embodiments of FIGS. 1 and 2 and FIG. 4 use the same numerals, and the descriptions thereof are not repeated, so as to simplify the description.

According to some embodiments of the disclosure, the bottom 12a comprises a metal member 121, a first insulation layer 123a, an outer insulation layer 124a, a first conductive layer 125a, and a protecting layer 127a. The first insulation layer 123a and the outer insulation layer 124a can be non-conductive glue. The first conductive layer 125a is affixed on the metal member 121 by the first insulation layer 123a, and the protecting layer 127a is affixed on the first conductive layer 125a by the outer insulation layer 124a. The protecting layer 127a can have one or more openings, and the first conductive layer 125a can be exposed from the openings for forming electrical connections.

Figure 5:
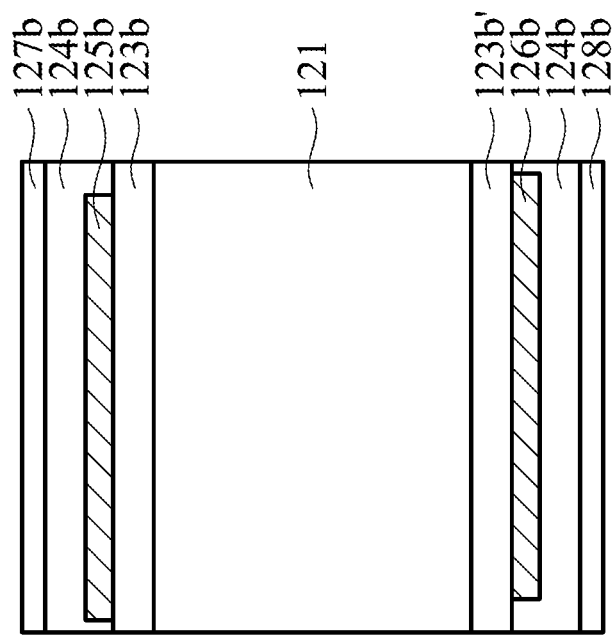
FIG. 5 is a cross-sectional view of a bottom, in accordance with some embodiments of the disclosure.

FIG. 5 is a cross-sectional view of a bottom 12b. The same features in the embodiments of FIGS. 1 and 2 and FIG. 5 use the same numerals, and the descriptions thereof are not repeated, so as to simplify the description.

According to some embodiments of the disclosure, the bottom 12b comprises a metal member 121, a first insulation layer 123b, a second insulation layer 123b', two outer insulation layers 124b, a first conductive layer 125b, a second conductive layer 126b, and two protecting layers 127b and 128b. The first insulation layer 123b and the second insulation layer 123b' are respectively formed on opposite surfaces of the metal member 121, and the second conductive layer 126b is formed on the second insulation layer 123b'. The first insulation layer 123b, the second insulation layer 123b', and the outer insulation layers 124b can be non-conductive glue. The first conductive layer 125b is affixed on the upper surface of the metal member 121 by the first insulation layer 123b, and the protecting layer 127b is affixed on the first conductive layer 125b by the outer insulation layer 124b. Furthermore, the second conductive layer 126b is affixed on the lower surface of the metal member 121 by the second insulation layer 123b', and the protecting layer 128b is affixed on the second conductive layer 126b by the outer insulation layer 124b. The protecting layers 127b and 128b can have one or more openings, and the first and second conductive layers 125b and 126b can be exposed from the openings for forming electrical connections.

Similarly, the first conductive layer 125b and the second conductive layer 126b can be formed on the first insulation layer 123b and the second insulation layer 123b' respectively by using a molded interconnect device or by coating, and the first conductive layer 125b, the second conductive layer 126b, and the metal member 121 can have the same coefficient of thermal expansion.

Figure 6:
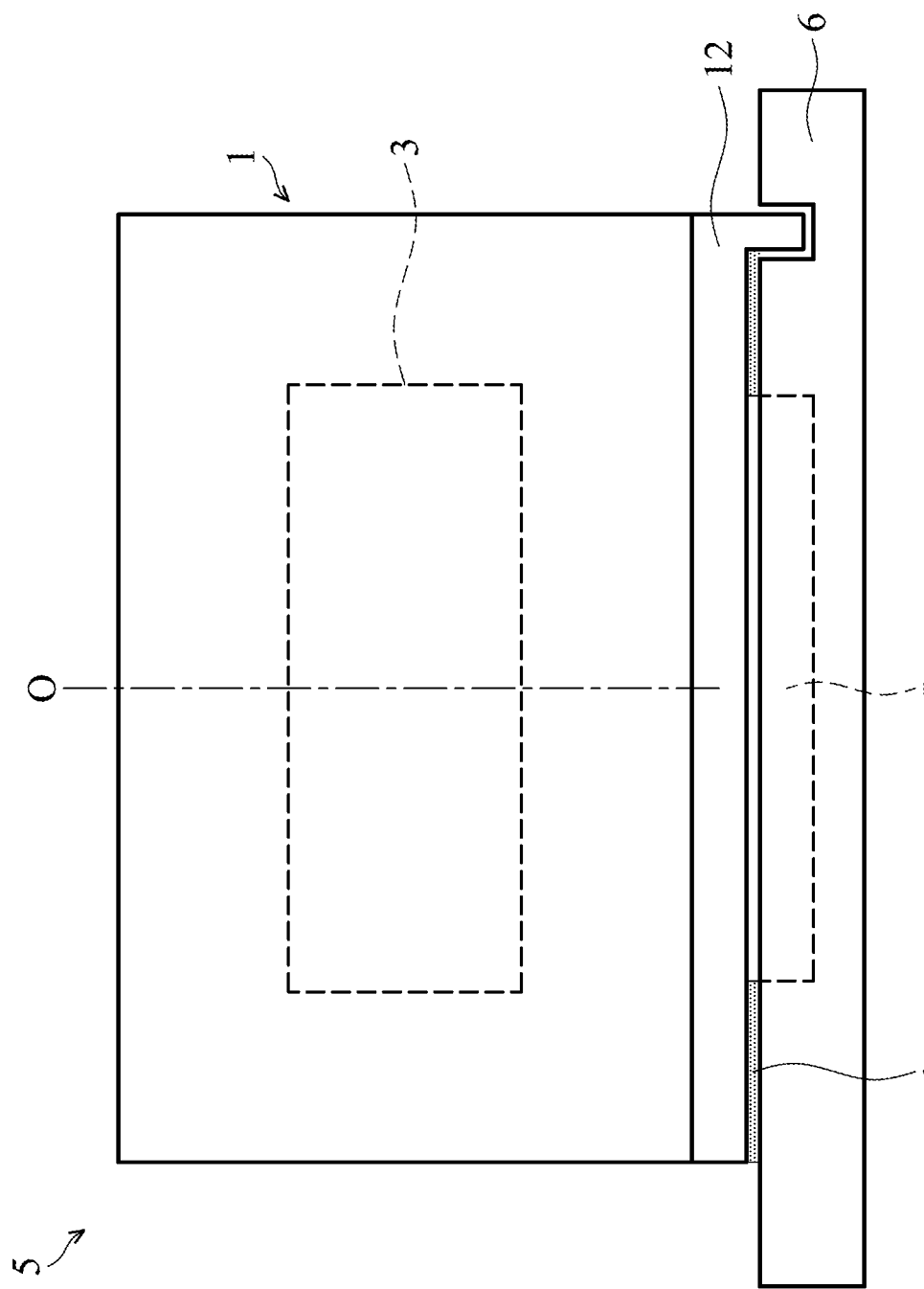
FIG. 6 is a cross-sectional view of a camera module, in accordance with some embodiments of the disclosure.

FIG. 6 is a cross-sectional view of a camera module 5, in accordance with some embodiments of the disclosure. According to some embodiments of the disclosure, the camera module 5 comprises any one of the aforementioned lens driving module 1, a circuit board 6, and an image sensor 7.

In some embodiments, the image sensor 7 is disposed on the circuit board 6. The image sensor 7 can be a complementary metal-oxide-semiconductor (CMOS) sensor, for example. The lens driving module 1 is disposed on the circuit board 6, wherein the optical axis O of the lens assembly 3 is aligned with the image sensor 7, and the bottom 12 faces the circuit board 6 directly. In some embodiments, the bottom 12 and the circuit board 6 are affixed to each other by an adhesive 8. The adhesive 8 directly contacts the metal member of the bottom 12 and the circuit board 6. It should be noted that, when the camera module 5 comprises the bottom 12b shown in FIG. 5, the second conductive layer 12b can be electrically connected to the image sensor 7 on the circuit board 6.

In some embodiments, when the camera module 5 comprises the bottom 12b shown in FIG. 5, the circuit board 6 can be omitted, and the image sensor 7 can be attached on the lower side of the bottom 12b directly, so as to reduce the height of the camera module 1.

Compared to the conventional technology, the embodiments described above provide various advantages. For example, in the various embodiments of the disclosure, since the camera module comprises the bottom having the metal member, which is used to replace the conventional plastic bottom, the full height of the camera module can be reduced, and the structural strength of the bottom can be enhanced.

Furthermore, in the various embodiments of the disclosure, since the flexible printed circuit board of the conventional driving module is removed from the camera module, and the conductive wires are formed in the bottom directly, the numbers of the members in the camera module can be reduced. Therefore, compared to the time it takes to assemble the suspension wires to the conventional flexible printed circuit board, the time required for assembling the suspension wires to the bottom of the disclosure can be reduced, and the yield can be improved. Further, since the bottom comprises the metal member, the flatness of the bottom can be enhanced, and the heat dissipation efficiency of the bottom can be improved.

Moreover, when the metal member is the lowest surface of the lens driving module, since the connecting strength between the metal member and the adhesive is greater than that between the plastic and the adhesive, the lens driving module can be tightly connected to the circuit board of the camera module. Also, the suspension wires can be tightly connected to the bottom by the connecting members. Therefore, the reliability of the camera module can be improved.

Furthermore, the electromagnetic wave entering or leaving the camera module can be reduced by the bottom having the metal member, so that electromagnetic interference can be reduced. Moreover, since the conductive layers (the metal member, the first conductive layer, the second conductive layer) and the non-conductive layers (the first insulation layer, the second insulation layer) in the bottom are arranged in a staggered manner, the numbers of the metal boundaries are increased. Thus, the border effect can be enhanced, and the electromagnetic interference can be reduced again.

It should be understood that different embodiments may offer different advantages, and not all the advantages are discussed herein, and that no particular advantage is required for all embodiments.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving module for driving an optical member having an optical axis, comprising:
   a bottom, comprising a metal member and a conductive layer;
   a holder, supporting the optical member and movably connected to the bottom;
   a first driving assembly, driving the holder to move relative to the bottom, wherein the first driving assembly comprises a driving coil electrically connected to the conductive layer;
   a housing, comprising an upper shell perpendicular to the optical axis and a side shell extending from the periphery of the upper shell along the optical axis;
   a frame; and
   a second driving assembly, driving the holder to move relative to the frame and electrically connected to the conductive layer, wherein the housing is affixed to the bottom via the side shell, the metal member has an opening and a surface, the optical axis passes through the opening, and the surface surrounds the opening.

2. The optical member driving module as claimed in claim 1, wherein the metal member has a lateral side corresponding to the side shell, and the surface is directly connected to the opening and the lateral side.

3. The optical member driving module as claimed in claim 2, wherein the housing comprises metal, and the metal member is affixed to the housing by welding.

4. The optical member driving module as claimed in claim 1, wherein the optical member driving module further comprises an image sensor corresponding to the optical member, and the metal member is disposed between the image sensor and the first driving assembly.

5. The optical member driving module as claimed in claim 1, wherein the optical member driving module further comprises a suspension wire, the frame is movably connected to the bottom via the suspension wire, and the holder is movably connected to the frame, wherein the metal member has a receiving portion for receiving the suspension wire.

6. The optical member driving module as claimed in claim 5, wherein suspension wire and the metal member are overlapped as observed from a direction perpendicular to the optical axis.

7. The optical member driving module as claimed in claim 5, wherein the surface is directly connected to the opening and the receiving portion.

8. The optical member driving module as claimed in claim 7, wherein the conductive layer is disposed on the metal member and electrically connected to the first driving assembly.

* * * * *